(12) United States Patent
Rodriguez et al.

(10) Patent No.: US 10,382,478 B2
(45) Date of Patent: Aug. 13, 2019

(54) DETECTING MALICIOUS DOMAINS AND CLIENT ADDRESSES IN DNS TRAFFIC

(71) Applicant: Cisco Technology, Inc., San Jose, CA (US)

(72) Inventors: David Brandon Rodriguez, Berkeley, CA (US); Yuxi Pan, Emeryville, CA (US)

(73) Assignee: Cisco Technology, Inc., San Jose, CA (US)

( * ) Notice: Subject to any disclaimer, the term of this patent is extended or adjusted under 35 U.S.C. 154(b) by 282 days.

(21) Appl. No.: 15/385,079

(22) Filed: Dec. 20, 2016

(65) Prior Publication Data

US 2018/0176232 A1  Jun. 21, 2018

(51) Int. Cl.
*H04L 29/06* (2006.01)
*H04L 29/12* (2006.01)
*H04L 12/26* (2006.01)

(52) U.S. Cl.
CPC .......... *H04L 63/145* (2013.01); *H04L 43/045* (2013.01); *H04L 43/062* (2013.01); *H04L 61/1511* (2013.01); *H04L 63/1425* (2013.01); *H04L 63/1458* (2013.01); *H04L 2463/144* (2013.01)

(58) Field of Classification Search
CPC . H04L 63/145; H04L 43/062; H04L 63/1425; H04L 61/1511; H04L 43/045
See application file for complete search history.

(56) References Cited

U.S. PATENT DOCUMENTS

| | | | |
|---|---|---|---|
| 8,065,731 B1* | 11/2011 | Nucci | G06F 21/568 713/187 |
| 8,516,585 B2* | 8/2013 | Cao | H04L 63/1441 713/187 |
| 8,682,812 B1 | 3/2014 | Ranjan | |
| 8,762,298 B1 | 6/2014 | Ranjan et al. | |
| 8,959,643 B1* | 2/2015 | Invernizzi | H04L 63/1425 713/187 |
| 9,032,527 B2 | 5/2015 | Manadhata et al. | |
| 9,183,387 B1* | 11/2015 | Altman | G06F 21/554 |
| 9,571,518 B2* | 2/2017 | Hu | H04L 63/1441 |
| 9,578,042 B2* | 2/2017 | Hu | H04L 63/126 |
| 9,680,861 B2* | 6/2017 | Ward | H04L 63/1441 |

(Continued)

OTHER PUBLICATIONS

Nan Jiang et. al., Identifying Suspicious Activities through DNS Failure Graph Analysis, IEEE, 2010.*

(Continued)

*Primary Examiner* — David Garcia Cervetti
(74) *Attorney, Agent, or Firm* — Behmke Innovation Group LLC; James Behmke; Stephen D. LeBarron

(57) ABSTRACT

In one embodiment, a device in a network constructs a graph based on Domain Name System (DNS) traffic in which vertices of the graph correspond to client addresses from the DNS traffic and domains from DNS traffic. The device uses stacked autoencoders to determine priors for the domains and client addresses. The device assigns the determined priors to the corresponding vertices of the graph. The device uses belief propagation on the graph to determine a malware inference from the graph. The device causes performance of a mitigation action when the malware inference from the graph indicates the presence of malware.

20 Claims, 14 Drawing Sheets

(56) References Cited

U.S. PATENT DOCUMENTS

| | | | |
|---|---|---|---|
| 9,686,291 B2* | 6/2017 | Antonakakis | H04L 61/1511 |
| 9,736,173 B2* | 8/2017 | Li | H04L 63/1416 |
| 9,749,336 B1* | 8/2017 | Zhang | H04L 63/14 |
| 9,891,907 B2* | 2/2018 | Searle | H04L 41/082 |
| 9,894,088 B2* | 2/2018 | Ward | H04L 63/1425 |
| 9,930,065 B2* | 3/2018 | Nelms | H04L 63/145 |
| 10,027,688 B2* | 7/2018 | Perdisci | H04L 63/1416 |
| 10,044,748 B2* | 8/2018 | Dagon | H04L 29/12066 |
| 10,050,986 B2* | 8/2018 | Nelms | H04L 63/1425 |
| 10,063,575 B2* | 8/2018 | Vasseur | G06N 20/00 |
| 10,063,578 B2* | 8/2018 | Flacher | H04L 63/1425 |
| 10,084,806 B2* | 9/2018 | Ward | H04L 63/1433 |
| 10,108,803 B2* | 10/2018 | Chari | G06F 21/577 |
| 10,133,865 B1* | 11/2018 | Feinman | G06F 21/56 |
| 10,164,991 B2* | 12/2018 | Savalle | H04L 63/1416 |
| 2005/0005017 A1* | 1/2005 | Ptacek | H04L 63/029 709/229 |
| 2005/0216956 A1* | 9/2005 | Orr | H04L 63/0209 726/23 |
| 2008/0086773 A1* | 4/2008 | Tuvell | G06F 21/55 726/23 |
| 2008/0086776 A1* | 4/2008 | Tuvell | G06F 21/564 726/24 |
| 2008/0196104 A1* | 8/2008 | Tuvell | H04L 51/12 726/24 |
| 2008/0240711 A1* | 10/2008 | Liu | H04B 10/0793 398/9 |
| 2011/0113491 A1* | 5/2011 | Altshuler | H04L 63/1425 726/24 |
| 2011/0295982 A1* | 12/2011 | Misra | H04L 63/1425 709/220 |
| 2012/0084860 A1* | 4/2012 | Cao | H04L 63/1441 726/23 |
| 2013/0055404 A1* | 2/2013 | Khalili | G06Q 10/00 726/25 |
| 2013/0097708 A1* | 4/2013 | Jayanthi | G06F 21/554 726/25 |
| 2015/0195299 A1* | 7/2015 | Zoldi | H04L 63/1433 726/25 |
| 2015/0278729 A1* | 10/2015 | Hu | G06Q 10/0635 705/7.28 |
| 2016/0065597 A1* | 3/2016 | Nguyen | H04L 63/1441 726/22 |
| 2016/0105454 A1* | 4/2016 | Li | H04L 63/1416 726/23 |
| 2016/0188880 A1* | 6/2016 | Smith | G06F 21/567 726/23 |
| 2016/0226819 A1* | 8/2016 | Manadhata | H04L 61/1511 |
| 2016/0261608 A1* | 9/2016 | Hu | H04L 63/126 |
| 2016/0261626 A1* | 9/2016 | Hu | H04L 63/1441 |
| 2017/0041333 A1* | 2/2017 | Mahjoub | H04L 61/1511 |
| 2017/0149907 A1* | 5/2017 | Balasubramanian | G06F 16/21 |
| 2017/0286690 A1* | 10/2017 | Chari | G06F 21/577 |
| 2017/0353480 A1* | 12/2017 | Gao | G06F 21/577 |
| 2018/0041536 A1* | 2/2018 | Berlin | G06N 3/04 |
| 2018/0097828 A1* | 4/2018 | Coskun | H04L 63/1425 |
| 2018/0103052 A1* | 4/2018 | Choudhury | G06F 21/566 |
| 2018/0114132 A1* | 4/2018 | Chen | G06F 12/0875 |
| 2018/0159876 A1* | 6/2018 | Park | G06F 16/9024 |
| 2018/0262516 A1* | 9/2018 | Zomlot | H04L 61/1511 |

OTHER PUBLICATIONS

Etienne Stalmans et. al., A Framework for DNS Based Detection and Mitigation of Malware Infections on a Network, IEEE, 2011.*

Jehyun Lee et. al., GMAD: Graph-based Malware Activity Detection by DNS traffic analysis, Elsevier, 2014.*

Camelo et al. "CONDENSER: A Graph-Based Approach for Detecting Botnets" pp. 1-8.

Zou et al. "Detecting Malware Based on DNS Graph Mining" International Journal of Distributed Sensor Networks; Oct. 5, 2015; pp. 1-11.

https://en.wikipedia.org/wiki/Belief_propagation; pp. 1-7.

https://github.com/cmgreen210/TensorFlowDeepAutoencoder; MNIST Digit Classification Using Stacked Autoencoder and TensorFlow; pp. 1-3.

Manadhata et al. "Detecting Malicious Domains via Graph Inference" © Copyright 2014 Hewlett-Packard Development Company, L.P.; pp. 1-21.

Hardy et al. "DL4MD: A Deep Learning Framework for Intelligent Malware Detection" Int'l Conf. Data Mining, DMIN'16; pp. 61-67.

* cited by examiner

DETECTING MALICIOUS DOMAINS AND CLIENT ADDRESSES IN DNS TRAFFIC

TECHNICAL FIELD

The present disclosure relates generally to computer networks, and, more particularly, to the detection of malicious domains and client addresses in domain name system (DNS) traffic.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network constructs a graph based on Domain Name System (DNS) traffic in which vertices of the graph correspond to client addresses from the DNS traffic and domains from DNS traffic. The device uses stacked autoencoders to determine priors for the domains and client addresses. The device assigns the determined priors to the corresponding vertices of the graph. The device uses belief propagation on the graph to determine a malware inference from the graph. The device causes performance of a mitigation action when the malware inference from the graph indicates the presence of malware.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Figure 1:
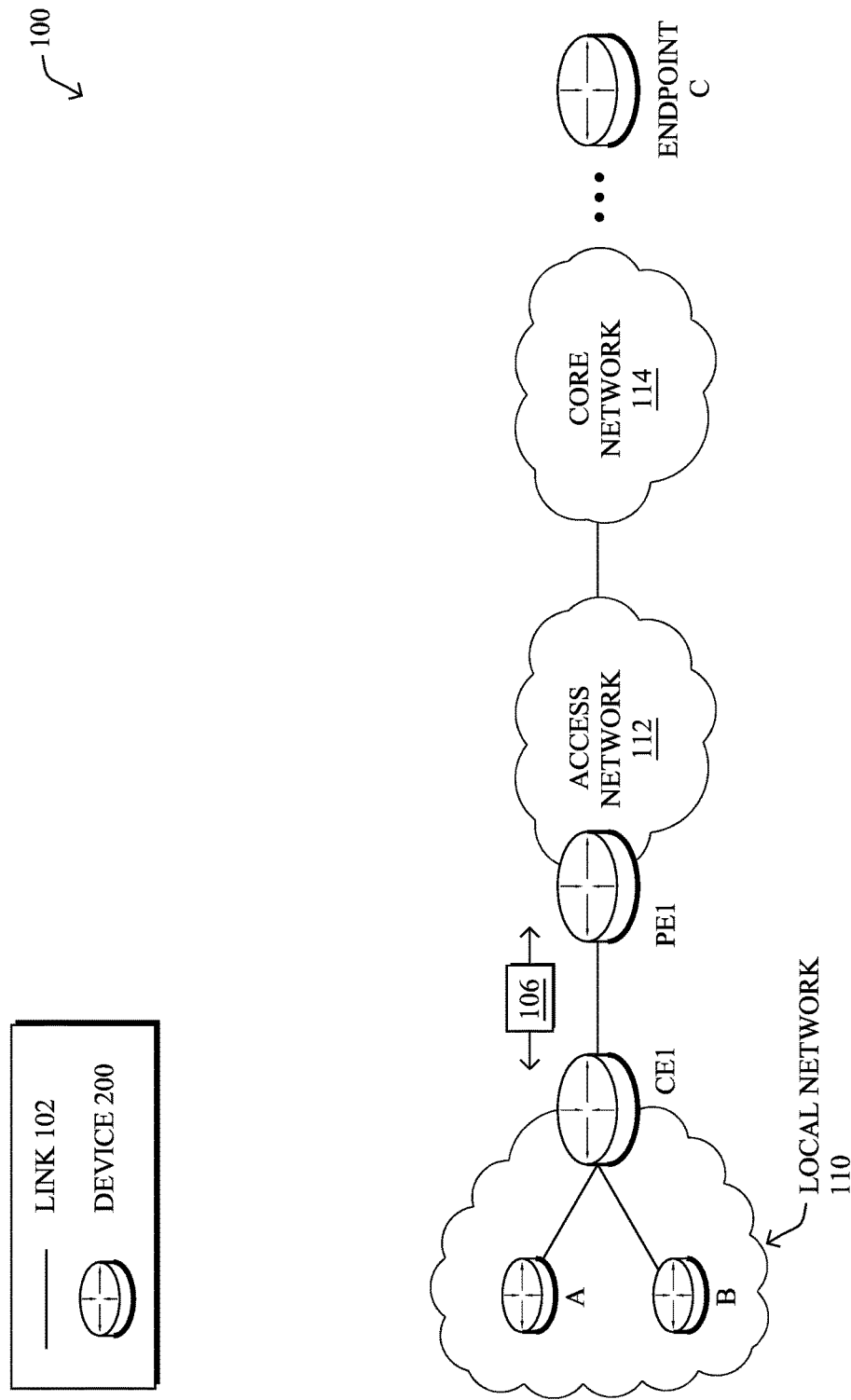
FIG. 1 illustrates an example communication network.

FIG. 1 is a schematic block diagram of an example communication network 100 illustratively comprising nodes/devices 200, such as a plurality of routers/devices interconnected by links and/or networks, as shown. For example, a customer edge (CE) router CE1 may interconnect nodes A and B on a local network 110 with a provider edge (PE) router PE1 of an access network 112. In turn, access network 112 may provide local network 110 with connectivity to a core network 114, such as the Internet.

The various nodes/devices 200 may exchange data packets 106 (e.g., traffic/messages) via communication network 100 over links 102 using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity. For example, node A in local network 110 may communicate with an endpoint node/device C (e.g., a remote server, etc.) via communication network 100.

As would be appreciated, links 102 may include any number of wired and/or wireless connections between devices. For example, node A may communicate wirelessly using a WiFi™ connection, CE1 and PE1 may communicate wirelessly using a cellular connection or via a hardwired connection (e.g., DSL, etc.), etc. In addition, while certain devices are depicted in FIG. 1, the view shown is a simplified view of communication network 100. In other words, communication network 100 may also include any number of intermediary networking devices such as, but not limited to, routers, switches, firewalls, etc., that are not shown.

In various embodiments, nodes/devices 200 may employ a secure communication mechanism, to encrypt and decrypt data packets 106. For example, nodes/devices 200 shown may use a Transport Layer Security (TLS) mechanism, such as the HTTPS protocol, to encrypt and decrypt data packets 106.

Figure 2:
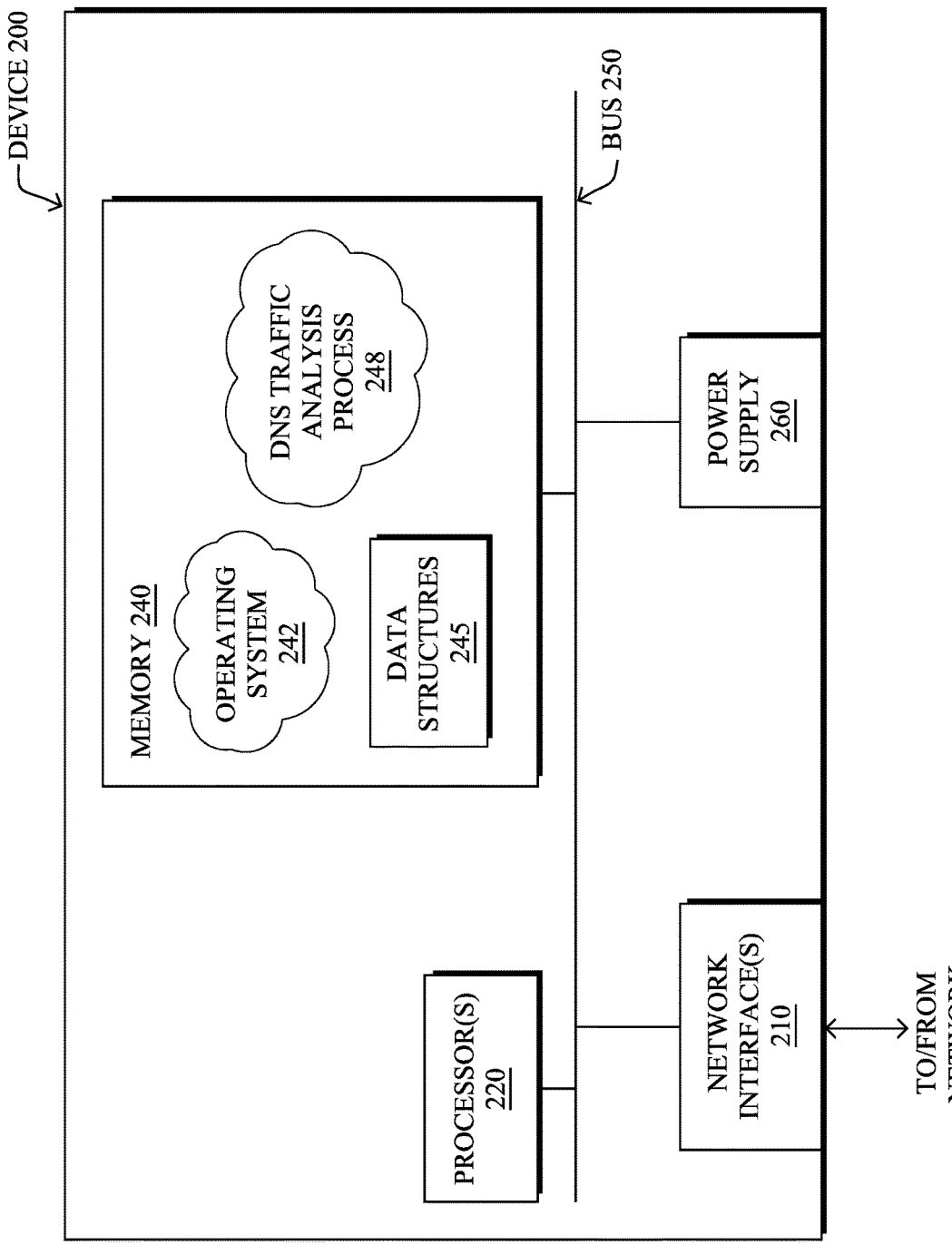
FIG. 2 illustrates an example network device/node.

FIG. 2 is a schematic block diagram of an example node/device 200 that may be used with one or more embodiments described herein, e.g., as any of the computing devices shown in FIG. 1, any other computing device that supports the operations of network 100 (e.g., switches, etc.), or any of the other devices referenced below. The device 200 may also be any other suitable type of device depending upon the type of network architecture in place. As shown, device 200 comprises one or more network interface(s) 210, one or more processor(s) 220, and a memory 240 interconnected by a system bus 250 and powered by a power supply 260.

The network interface(s) 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interface(s) 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a DNS query analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, botnets represent a security concern for network administrators. Once a client device has been infected with malware for the botnet, it may communicate with a command and control (C&C) server which sends control commands to the infected device. If the address of the C&C server is hardcoded into the malware itself, preventing operation of the botnet becomes a trivial task. Notably, all an administrator would need to do is block the address of the C&C server, to defeat control over the infected client device. However, many modern forms of malware do not use hardcoded addresses, but instead rely on domain generation algorithms (DGAs), to elude detection. Similar mechanisms are also used by other forms of malware, such as those that exfiltrate data from a network and the like.

In general, a DGA is a mechanism that generates a set of domain names based on some criteria, such as the time of day, month, year, etc. For example, a DGA may generate the domain names {a.com, b.com, a.b.com, . . . } on one day and the domains {bc.com, b.info, . . . } on the next day. In turn, the infected client device may perform a lookup of some or all of the generated domain names, to obtain the IP address of the C&C server.

Figure 3A:
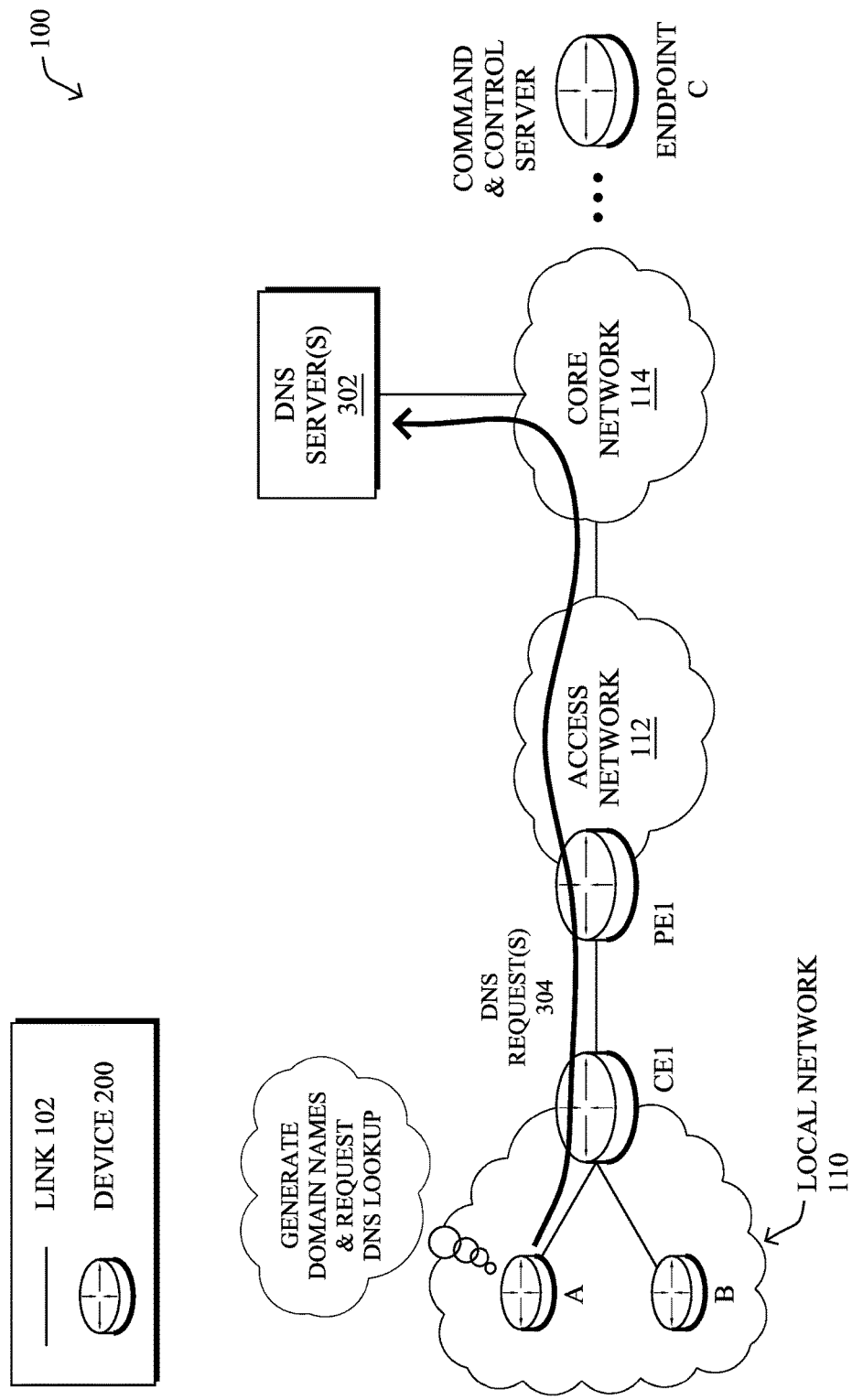
FIGS. 3A-3B illustrate an example of a domain name system (DNS) lookup.
Figure 3B:
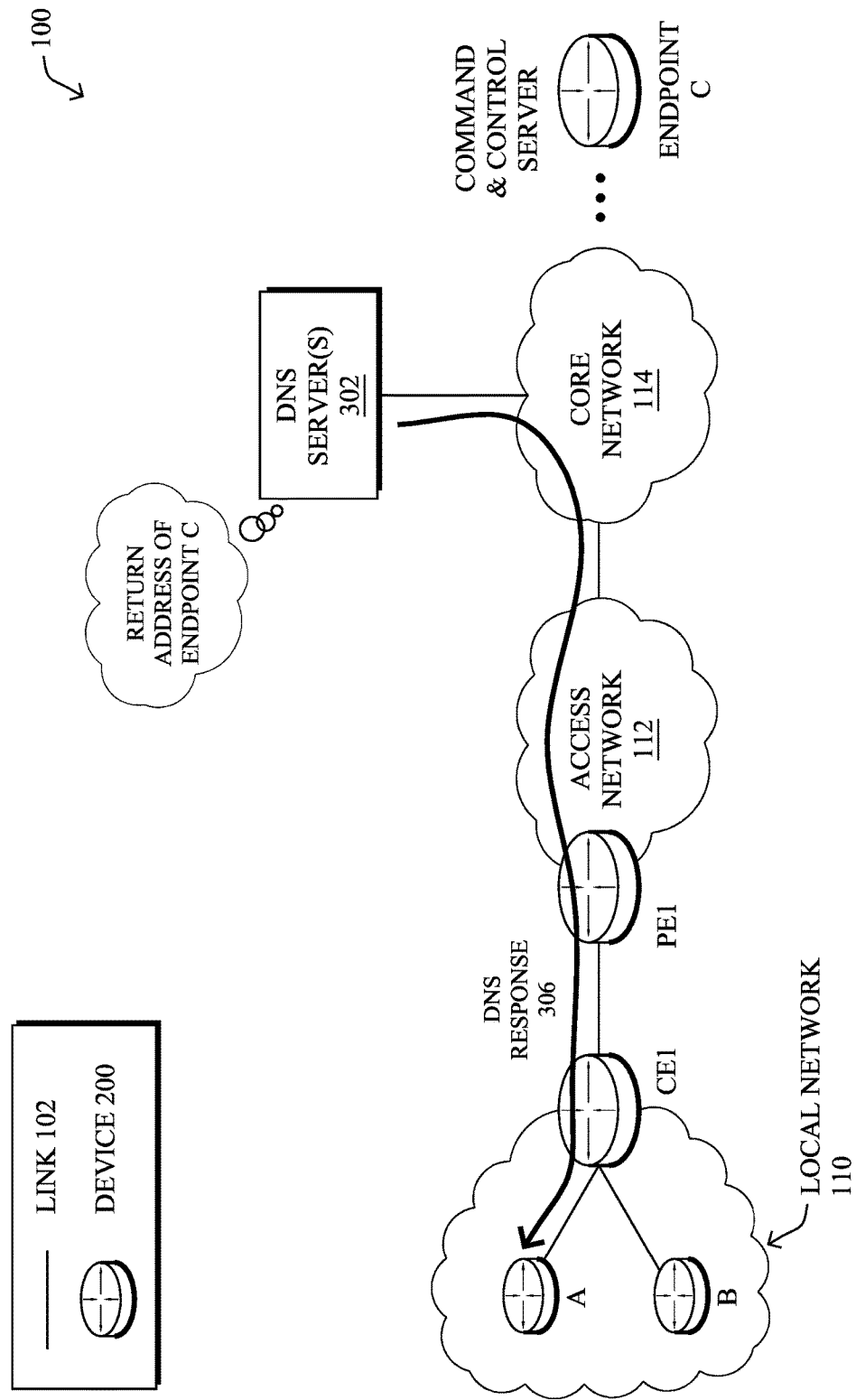

FIGS. 3A-3B illustrate an example of a domain name system (DNS) lookup. As shown, assume that client device A has been infected with malware that uses a DGA to communicate with a corresponding C&C server, endpoint device C shown. During operation, both infected client device A and endpoint C may execute a DGA to generate a corresponding set of domain names. In turn, endpoint C or the entity associated therewith may register one or more of the generated domain names with a DNS service (e.g., to associate the IP address of endpoint C with a generated domain name). Infected client device A may then send one or more DNS requests 304 to a DNS service provided by DNS server(s) 302, to look up the IP address associated with one or more of the generated domain names. This allows the C&C server to constantly switch IP addresses to avoid blocking mechanism and still retain control over the infected client devices.

To further avoid detection, the number of domain names generated by a DGA during any given time, the number of domain names registered to the C&C server during any given time, and/or the number of domain names queried by an infected client device may be variable. For example, if the DGA generates 100,000 domain names per day, the C&C server registers only one domain name per day, and an infected client queries 1,000 domain names per day, this gives the client a 1% chance of making contact with the C&C server during any given day. As shown in FIG. 3B, assume that the address of server C is registered to one of the DGA-generated domain names included in DNS request(s) 304. In such a case, DNS server 302 may include the address of server C in a DNS response 306 sent back to infected client device A. With this address, client device A is now able to make direct contact with the C&C server, endpoint C, to receive further commands for its installed malware.

As noted above, DNS requests are extremely ubiquitous, with millions of requests being resolved every second. This presents certain challenges when attempting to detect malicious traffic using behavioral models. On one hand, such a model needs to be responsive to the various types of client behavior that could be observed. On the other, because of the sheer volume of ingested data, the models also need to be incrementally updated with new observations that are labeled and unlabeled, as needed.

In some embodiments, it may be possible to detect malicious traffic by constructing a client IP-domain-hosting IP graph and assessing the properties of the graph. However, doing so would also neglect the temporal properties of the client IP sessions. For example, assume that a particular client queries domains a, b, and c with the set of domains {a,b,c} all being malicious. If no client IP session information is used, an inherent relationship is lost which might used to infer that a subsequent domain queried by the client is also malicious. With the use of a client IP domain graph, one can incorporate the temporal relationship of client IP behavior.

By incorporating domain-domain edges in the graph, one can take into account the temporal relationship of domains visited by the same client. In other words, from the example above, the relationship between the domains is maintained and can be used to identify malicious domains and client IP addresses.

Detecting Malicious Domains and Client Addresses in DNS Traffic

The techniques herein allow for the identification of malicious domains and client IP addresses using a model that is able to adapt to millions of different clients and the varying behaviors. In some aspects, the techniques herein leverage a deep learning model based on stacked autoencoders, to pre-train a deep neural network and fine tune on a subset of labeled data (e.g., labeled domains and client addresses that are known to be either malicious or benign). Using the derived probabilities from the deep learning model, the techniques herein further introduce a belief propagation technique to make inferences as to the maliciousness of particular domains and client addresses. Such inferences can be used to perform a mitigation action when a malicious domain or client address is identified (e.g., generating an alert based on the malware inference, blocking traffic associated with a potentially infected client, etc.).

Specifically, according to one or more embodiments of the disclosure as described in detail below, a device in a network constructs a graph based on Domain Name System (DNS) traffic in which vertices of the graph correspond to client addresses from the DNS traffic and domains from DNS traffic. The device uses stacked autoencoders to determine priors for the domains and client addresses. The device assigns the determined priors to the corresponding vertices of the graph. The device uses belief propagation on the graph to determine a malware inference from the graph. The device causes performance of a mitigation action when the malware inference from the graph indicates the presence of malware.

Illustratively, the techniques described herein may be performed by hardware, software, and/or firmware, such as in accordance with the DNS traffic analysis process 248, which may include computer executable instructions executed by the processor 220 to perform functions relating to the techniques described herein.

Figure 4:
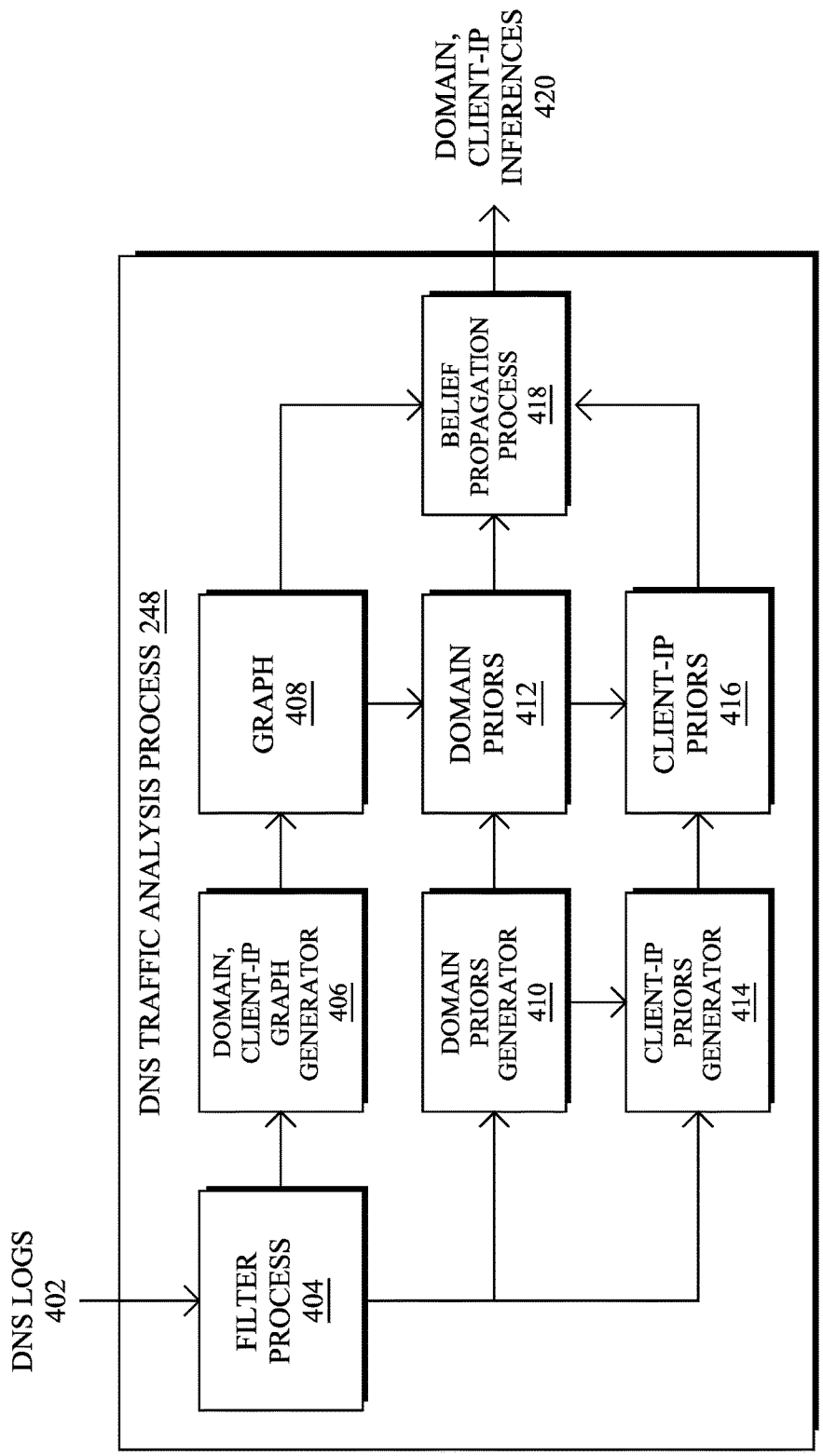
FIG. 4 illustrates an example architecture for analyzing DNS traffic.

Operationally, FIG. 4 illustrates an example architecture for analyzing DNS traffic, in accordance with the techniques disclosed herein. As shown, DNS traffic analysis process 248 may be configured to output inferences 420 for domains and client IP addresses (e.g., a measure of how strongly a client address or domain is believed malicious), based on an input set of logs 402 for DNS traffic observed in the network. In various embodiments, inferences 420 may be malware inferences. In general, a malware inference may be indicative of any or all of the following: 1.) a malicious domain/address of a server that delivers malware, 2.) a transit device/address along the path to a server that delivers malware, 3.) a compromised website/address, or 4.) a client device/address that has been infected by malware. To do so, DNS traffic analysis process 248 may execute any number of subroutines, such as those shown in FIG. 4 and described below. As would be appreciated, the subroutines shown are exemplary only and may be combined, divided, or even distributed across multiple devices, as desired.

As shown, DNS traffic analysis process 248 may receive DNS logs 402 regarding any number of observed DNS-related traffic flows in the network. For example, DNS logs 402 may be generated by the DNS service itself and/or by any intermediate devices located between the client device that issues a DNS query and the DNS service. In further cases, some or all of DNS logs 402 may be captured locally by the device executing DNS traffic analysis process 248. In general, DNS logs 402 may indicate the (IP) address of the client, the queried domain, the IP address associated with the domain, characteristics of the domain (e.g., how long the domain has been registered, a rank, etc.), and/or any other information that can be obtained regarding the DNS traffic.

In some embodiments, DNS traffic analysis process 248 may include a filter process 404 operable to analyze DNS logs 402 and separate the information from DNS logs 402 into two categories: 1.) client address-related information and 2.) domain-related information. In turn, filter process 404 may provide the client address-related information to a client-IP priors generator 414 and provide the domain-related information to a domain priors generator 410. Additionally, filter process 404 may also extract out the domain-client IP tuples from DNS logs 402 for processing by domain, client IP graph generator 406.

Generally, domain, client IP graph generator 406 may be operable to construct a graph 408 that relates the observed client IP addresses to the queried domains from DNS logs 402. In some embodiments, the vertices of graph 408 may represent the unique client addresses and unique domains. Likewise, edges of graph 408 may represent the relationship between the vertices such as, for example, queries made by the client addresses for the various domains. By way of example, consider the case of client addresses, A, B, and C, that each perform a lookup of a domain D. In such a case, the resulting graph may include vertices to represent A-D and may include directed edges from each of vertices A-C to domain D (e.g., to represent the lookups performed by the clients). For the domains and client IPs in graph 408, DNS traffic analysis process 248 can extract out their corresponding features from DNS logs 402, as described below.

For the domains and client IP addresses in graph 408 (e.g., the vertices of graph 408), DNS traffic analysis process 248 may determine their priors separately. Notably, domain priors generator 410 may generate domain priors 412 and client IP priors generator 414 may generate client IP priors 416. From these, according to various embodiments, a belief propagation process 418 may employ belief propagation to graph 408 and to priors 412, 416 to make malware inferences 420 regarding the domains and client IP addresses. In turn, the device(s) executing DNS traffic analysis process 248 may cause the performance of a mitigation action when inferences 420 indicate the presence of malware. For example, the device executing DNS traffic analysis process 248, or another device in communication therewith, may drop or block traffic associated with the malware-flagged client or with the malware-flagged domain, may generate an alert (e.g., to the user of the client, to a network administrator, etc.) regarding the detection, or perform any other mitigation action.

Figure 5:
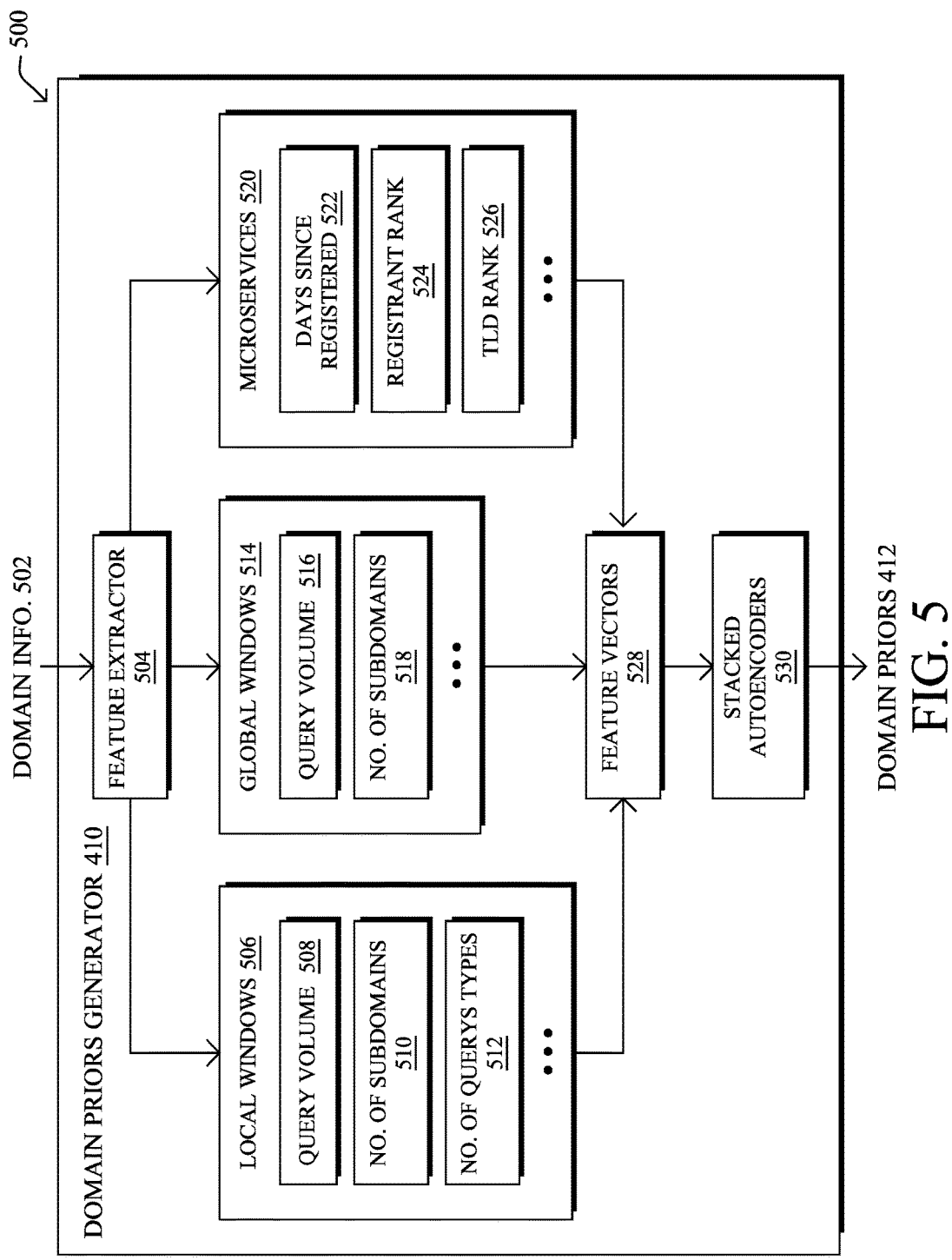
FIG. 5 illustrates an example architecture for determining domain priors.

Referring now to FIG. 5, an example architecture 500 for determining domain priors is shown, according to various embodiments. As shown, domain priors generator 410 may receive the domain information 502 extracted from DNS logs 402 by filter process 404 described previously with respect to FIG. 4. In various embodiments, domain priors generator 410 may include a feature extractor 504 configured to extract out the domain-specific features for analysis. These features may, for example, be subdivided into three categories: 1.) a subset 506 of features from a local time window, 2.) a subset 514 of features from a global time window, and a subset 520 of features that are microservice-related.

As shown, feature extractor 504 may divide domain information 502 into any number of predefined local time windows $w_i$. For example, if domain information 502 is sampled from one hours' worth of DNS logs 402, feature extractor 504 may subdivide domain information 502 by ten minute intervals (e.g., local time windows). In turn, feature extractor 504 may extract out any number of features/ characteristics for a given domain within the local time window. Such features may include, but are not limited to, the query volume 508 for the domain that occurred within the local time window, the number of subdomains 510 that were queried for the domain within the local time window, the number of different query types 512 that occurred within the local time window, etc.

Feature extractor 504 may also extract out a subset 514 of features for a global time window. In general, a global time window corresponds to a larger time window than that of a local time window. For example, feature extractor 504 may consider domain information 502 from the past twenty eight days and extract features within global time windows of one day. In some cases, this may require the device executing domain priors generator 410 to receive a portion of domain information 502 from another device or from a separate data store maintained locally by the device. Notably, DNS logs 402 and/or the domain information 502 derived therefrom may be archived, in some cases, after a certain time (e.g., after the current day, week, etc.) has passed. In such cases, domain priors generator 410 may receive at least a portion of the domain information 502 from the global time window(s) from this archive. As shown, subset 514 may include similar features as that of subset 506, such as a query volume 516 for the domain, a number of subdomains 518 for the domain, etc., and/or other domain-related features that can be extracted for a global time window.

Finally, in some cases, feature extractor 504 may extract out features from domain information 502 for subset 520 that are microservice-related. Generally, subset 520 may include the features of the domain information 502 that correspond to specific events for the domain. For example, subset 520 may include, but is not limited to, a count 522 of the number days since the domain was registered, a rank 524 of the registrant of the domain, a top level domain (TLD) rank 526 of the domain (e.g., a score between [0,1] whereby 0 represents a benign TLD and 1 represents a malicious TLD, etc.), and/or other such features.

In various embodiments, domain priors generator 410 may construct feature vectors 528 based on the extracted features in subsets 506, 514, and 520, for input to a set of stacked autoencoders 530. In general, an autoencoder is a form of artificial neural network that attempts to learn a representation of the input set of data (e.g., for purposes of dimensionality reduction, etc.). Accordingly, an autoencoder may include one or more hidden layer between the inputs and outputs that connects and maps the input and output layers. Stacked autoencoders are a specialized form of autoencoders in which multiple autoencoders are chained together to train successive layers of the overall neural network in a greedy fashion. Notably, the outputs of one autoencoder in stacked autoencoders 530 at one level of the neural network may be fed as input to another autoencoder at the next layer. A final layer may also be added to stack autoencoders 530 and updated/trained with k labelled feature vectors. In such cases, stacked autoencoders 530 may use a cross-entropy loss function and perform backpropagation using gradient descent, to generate domain priors 412 as final outputs. In various embodiments, domain priors 412 may be indicative of a probability that a particular domain is malicious/malware-related. In other words, stacked autoencoders 530 may be trained to distinguish between two classes of domains: benign domains and malicious domains (e.g., based on a threshold probability).

Figure 6:
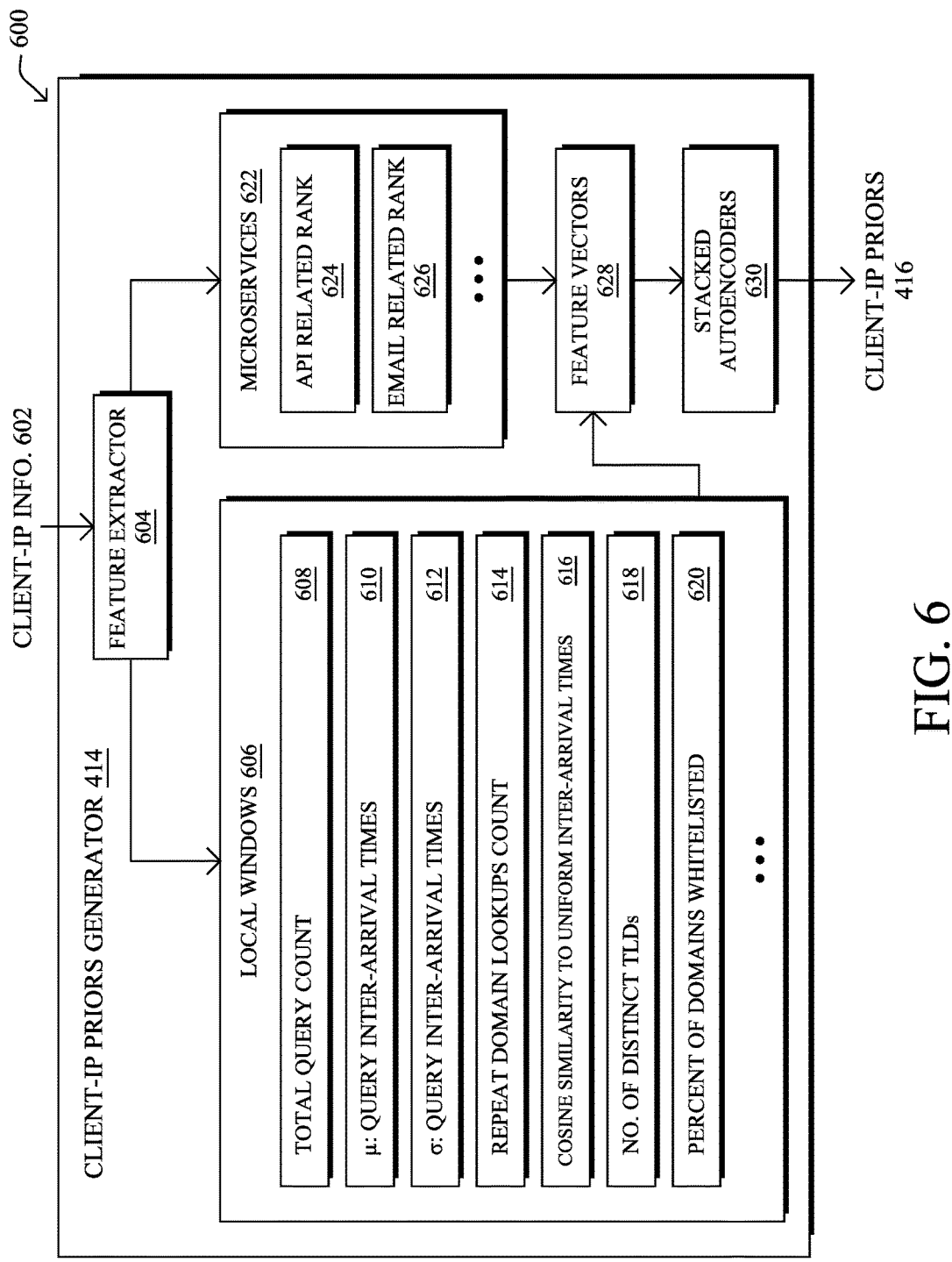
FIG. 6 illustrates an example architecture for determining client address priors.

Referring now to FIG. 6, an example architecture 600 for determining client address priors is shown, according to various embodiments. As shown, and similar to domain priors generator 410, client IP priors generator 414 may receive the client IP address-related information from DNS logs 402 that were filtered by filter process 404. In other words, in contrast to the domain-related information 502 processed by domain priors generator 410, client IP priors generator 414 may receive and assess the characteristics/ features in client IP information 602 that are instead related to the specific client addresses and filtered from DNS logs 402.

In various embodiments, client IP priors generator 414 may include a feature extractor 604 operable to generate various subsets of information 602. For example, feature extractor 604 may divide client IP information 602 into two categories: 1.) a subset 606 of client address-related features that are from various time windows, and 2.) a subset 622 of client address-related features that are associated with microservices.

The local time windows used to construct features subset 606 may be the same local time windows used by domain priors generator 410 or different time windows, as desired. For example, local time windows may be in ten minute increments, hourly increments, etc. Since client IP traffic/ behavior is dynamic by nature, global time windows are not needed to access the client IP-related information 602. For a given client IP address, subset 606 may include, but is not limited to, any or all of: a total DNS query count 608 by the address, mean and standard deviation metrics 610-612 of the DNS query inter-arrival times, a count 614 of repeated domain lookups by the address, a cosine similarity to uniform inter-arrival query time metrics 616 for the address, a count 618 of the number of distinct TLDs queried by the address, a percent 620 of queried domains by the address that are whitelisted, and/or other such features.

Subset 622 may include any number of scores, ranks, count, etc. associated with the particular client IP from client IP information 602. For example, subset 622 may include, but is not limited to, an API-related rank 624 associated with the client IP, an email-related rank 626 associated with the client IP, etc.

Also similar to domain priors generator 410, client IP priors generator 414 may combine the features in subsets 606 and 622 into feature vectors 628 for input to a set of stacked autoencoders 630. Using a set of labeled features, stacked autoencoders 630 may be trained to output client IP priors 416 that are indicative of the probability that a given client has been infected with malware and/or is malicious. Thus, stacked autoencoders 630 may be able to classify a given client IP address as benign or malicious in view of its constructed feature vector(s) 628.

Figure 7:
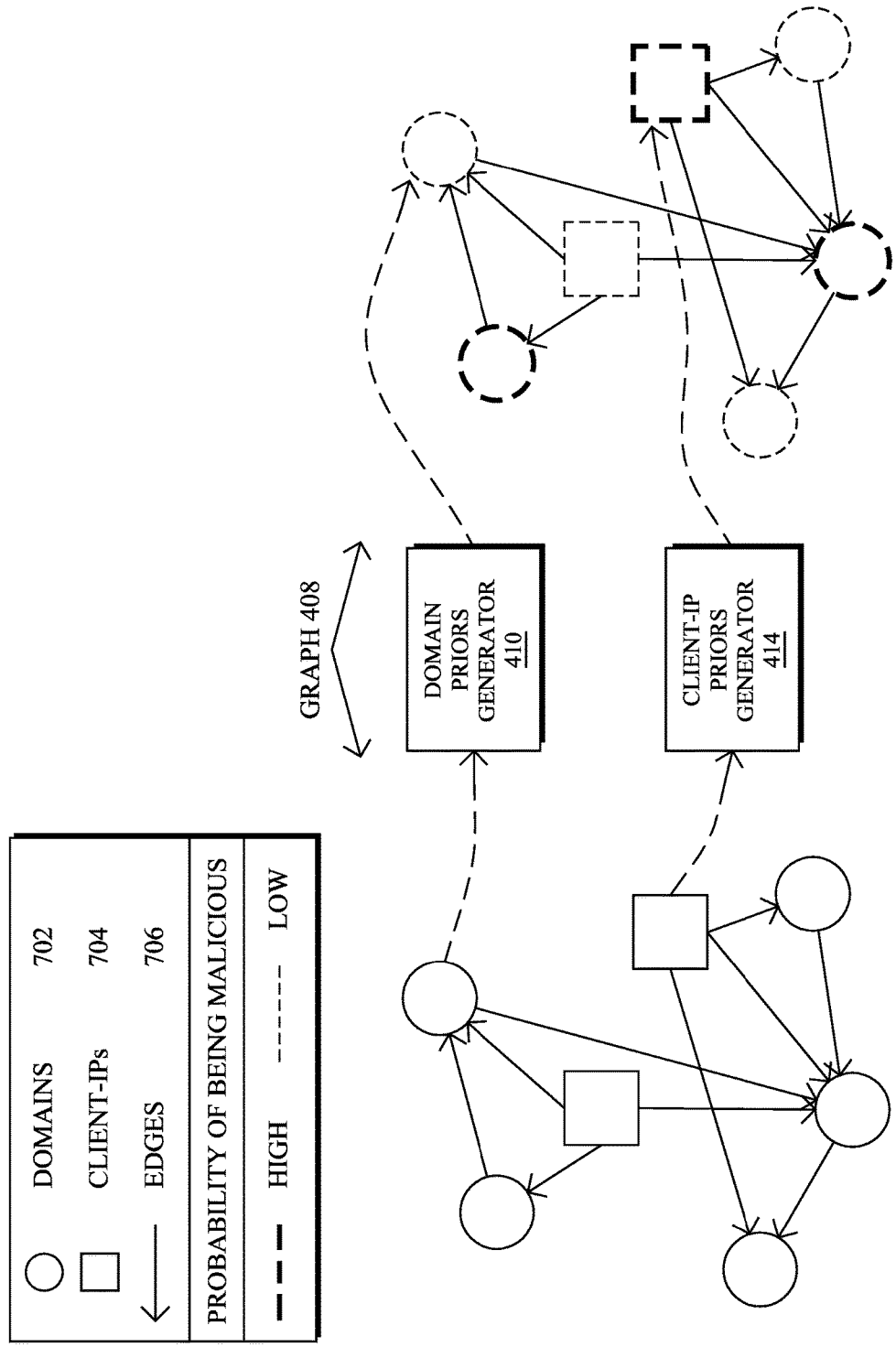
FIG. 7 illustrates an example of assigning prior probabilities to graph vertices.

FIG. 7 illustrates an example of assigning prior probabilities to graph vertices, according to various embodiments. As shown, assume that graph 408 generated by graph generator 406 includes domain vertices 702 that represent the various domains from the DNS logs 402 as well as client IP vertices 704 that represent the various client IP addresses from DNS logs 402. Edges 706 may, in some cases, be directed and represent the relationships between various vertices. For example, an edge 706 between a client IP vertex 704 a domain vertex 702 may represent a DNS lookup requested by the client for the corresponding domain. Similarly, an edge 706 between domain vertices 702 may represent a relationship between a pair of domains visited by the same client in a consecutive manner, or the like.

In various embodiments, for each of the domain-related vertices 702 of graph 408, DNS traffic analysis process 248 may map the corresponding domain prior 412 from domain priors generator 410. Similarly, for each of the client IP-related vertices 704 of graph 408, DNS traffic analysis process 248 may map the corresponding client IP prior 416 from client IP priors generator 414. As noted previously, priors 412 and 416 may be indicative of a probability of the corresponding domain or client address being malicious, as determined by the respective stacked autoencoders of prior generators 410 and 414. Thus, each vertex 702-704 may have an assigned prior probability of being malicious (e.g., on a scale from 0-1, etc.), thereby distinguishing those vertices with a high probability of being malicious from those vertices with a low probability of being malicious.

Figure 8:
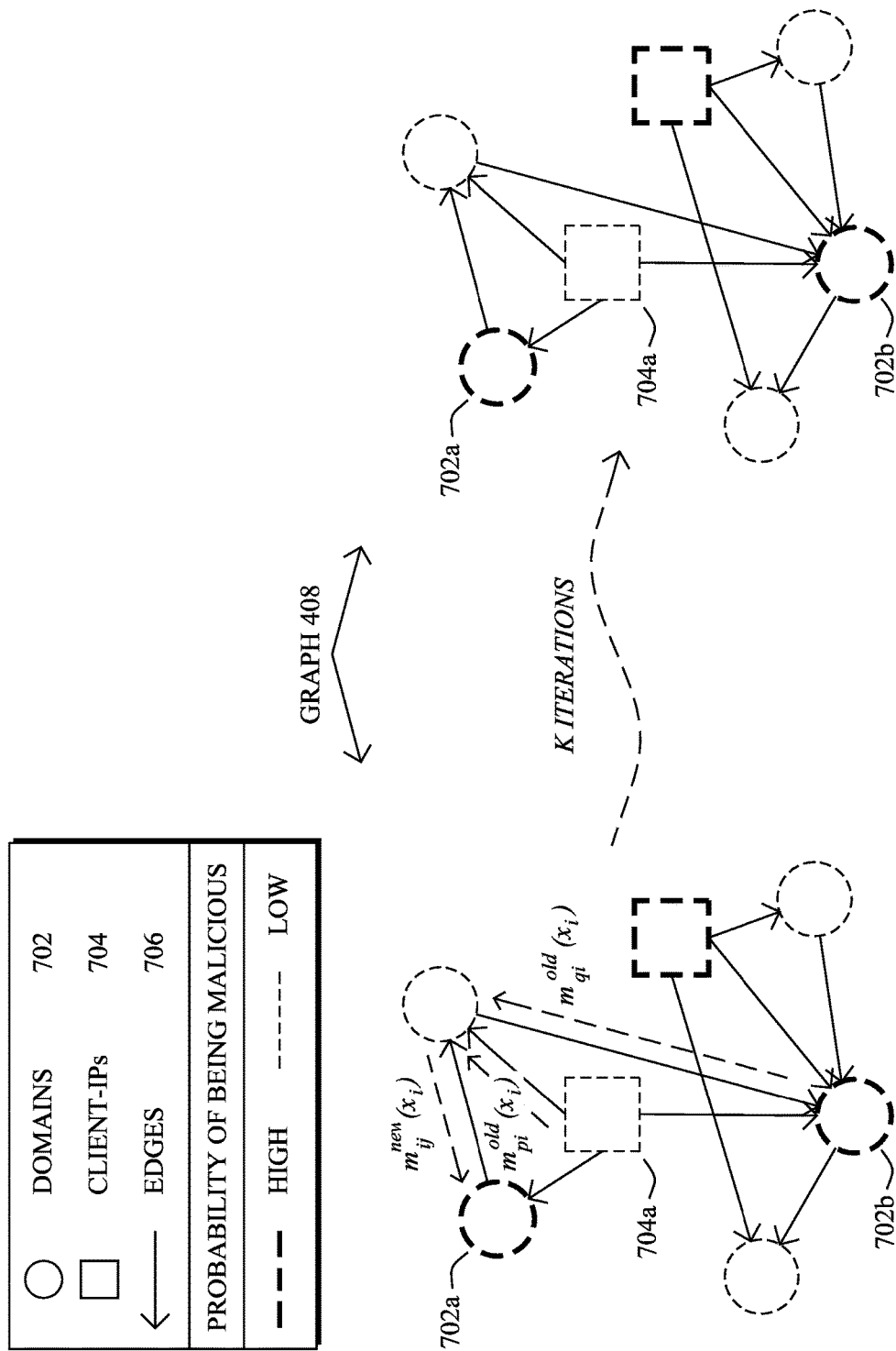
FIG. 8 illustrates an example of using belief propagation to determine a malware inference from a graph.

FIG. 8 illustrates an example of using belief propagation to determine a malware inference from a graph, according to various embodiments. Continuing the example of graph 408 from FIG. 7, having assigned a prior probability to each vertex 702-704 of graph 408, belief propagation process 418 may use belief propagation to update the priors/probabilities assigned to each vertex 702-704. From this, the resulting probability assigned to any given vertex of graph 408 represents the probability of the represented domain or client being malicious (e.g., an inference 420).

In general, belief propagation, which is also known as sum-product message passing, allows for the making of inferences from a graphical model using message passing. In this context, a "message" is a function that is passed along with edges between nodes and represents the influence that a particular variable has on another. In other words, the degree to which the prior/probability for a given vertex is updated depends on the strength of the connections along its edges and the probabilities of its neighboring vertices.

By way of example, consider the client IP vertex 704a of graph 408 that represents a particular client address in the network. During execution, belief propagation process 418 may pass messages m between the various vertices shown, to update the assigned probabilities. By virtue of this message passing, as well as the neighboring nodes 702a-702b of node 704b having high priors/probabilities of being malicious, process 418 may update the probability assigned to vertex 704a to indicate that the corresponding client IP address also has a high probability of being malicious/malware-related. In turn, based on the updated probability assigned to node 704a, the device may cause the performance of any number of mitigation actions. For example, if the probability is above a predefined threshold, the device may cause the sending of an alert to the user of the client and/or to a network administrator, to alert the person that the client is suspected of being infected with malware.

A working prototype using the techniques herein was constructed in TensorFlow™ to construct the stacked autoencoder-based deep learning model and calculate prior probabilities, GraphX™ was then used to construct the graph and the belief propagation was performed by massage passing routines written in Scala. Diagram 900 illustrates the TensorFlow™ stacked autoencoders, which comprises three layers of autoencoders 910-930, each of which has outputs wired to the inputs of the next successive layer. During training, autoencoders 910-930 were used to pre-train the corresponding three hidden layers of the neural network in a greedy fashion on an unlabeled dataset. Additionally, a set of labeled data was used to determine the weights for the final output layer of the neural network. Such an architecture may be used, for example, to implement the stacked autoencoders 530 and 630 described above.

Figure 9A:
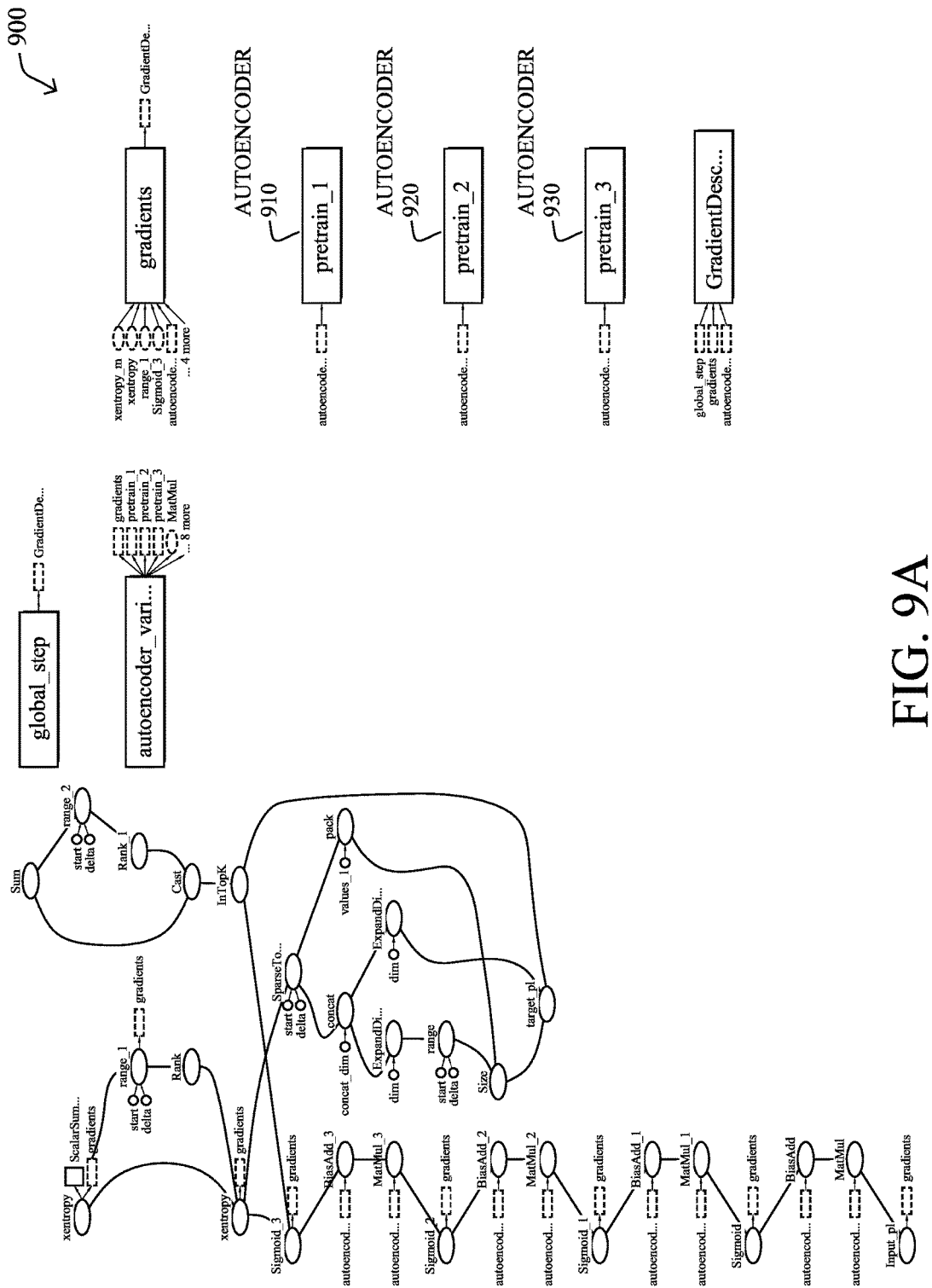
FIGS. 9A-9D illustrate an example prototype architecture for using stacked autoencoders on DNS traffic.
Figure 9B:
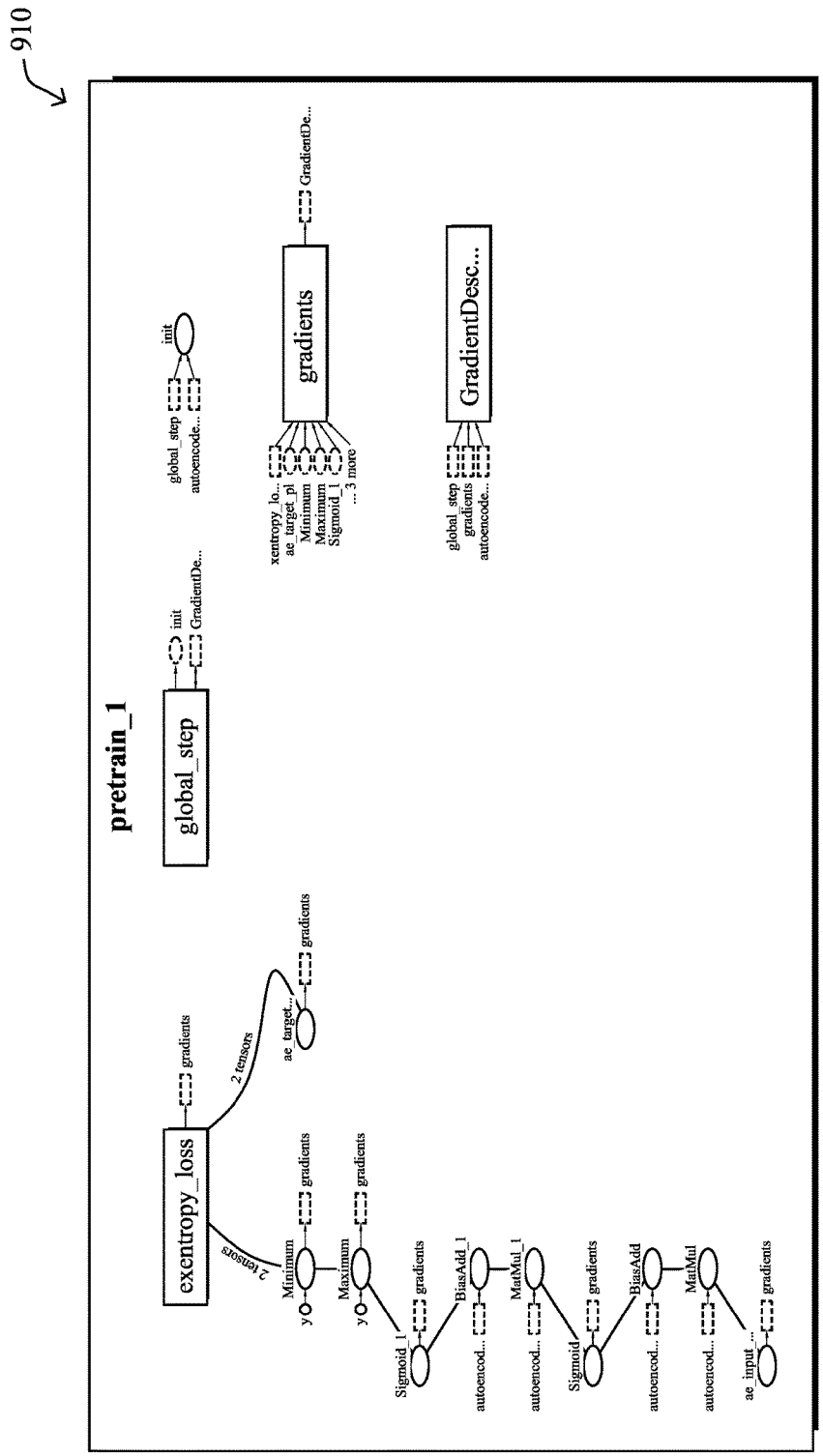

FIG. 9B illustrates the architecture for autoencoder 910, the first of the stacked autoencoders. As shown, autoencoder 910 performs back propagation in a greedy fashion to encode/decode the input feature vectors using gradient decent on the cross-entropy loss function. As noted above, these feature vectors are unlabeled and may include any number of domain-related or client address-related features.

Figure 9C:
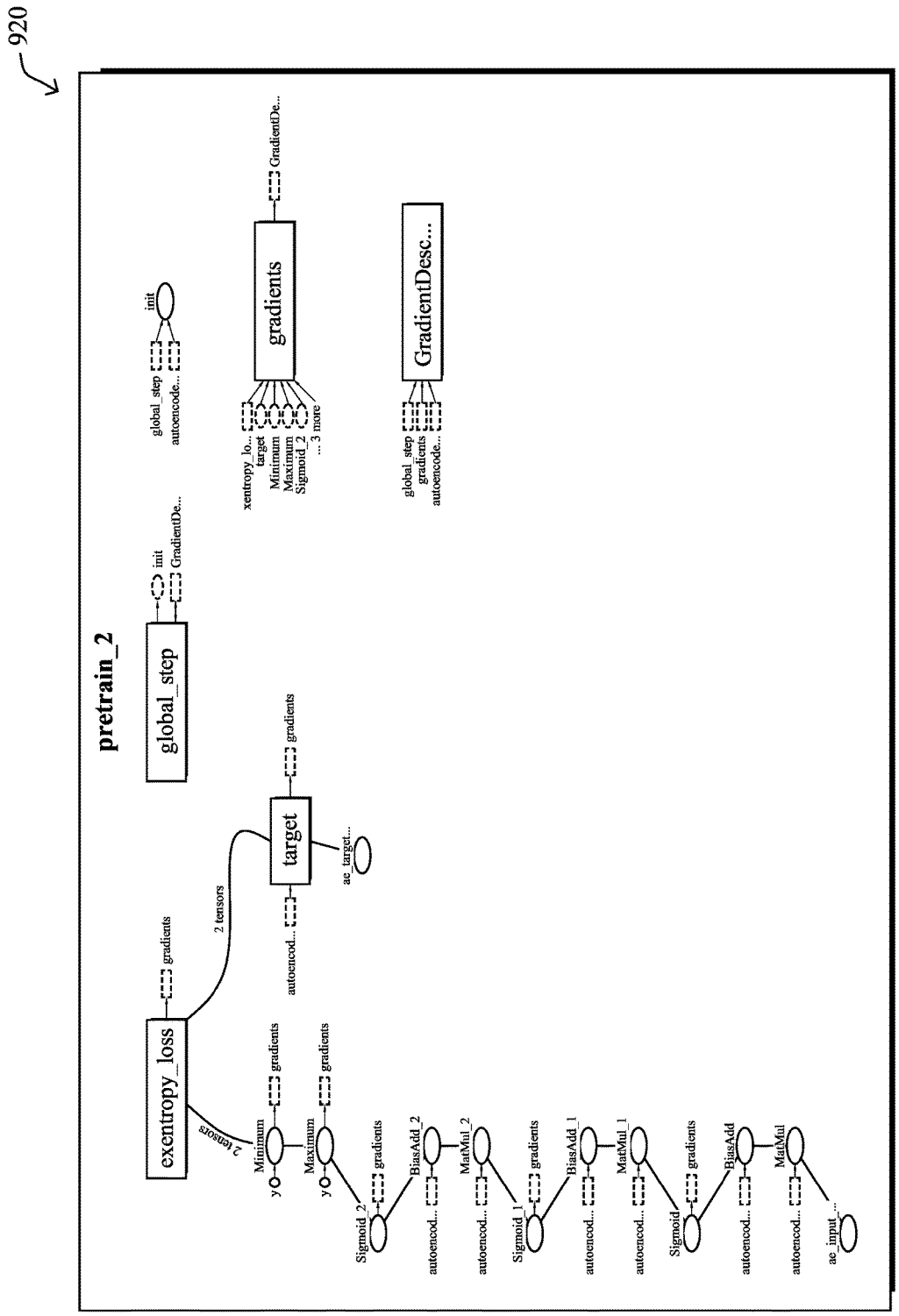

FIG. 9C illustrates the architecture for autoencoder 920, the second of the stacked autoencoders. The greedy procedure, mentioned above, more specifically trains a new autoencoder to encode/decide the same n vectors used to train the previous layer (e.g., autoencoder 910). The difference, however, is that autoencoder 920 uses as input the transformation of the n-number of input feature vectors from encoding by autoencoder 910.

Figure 9D:
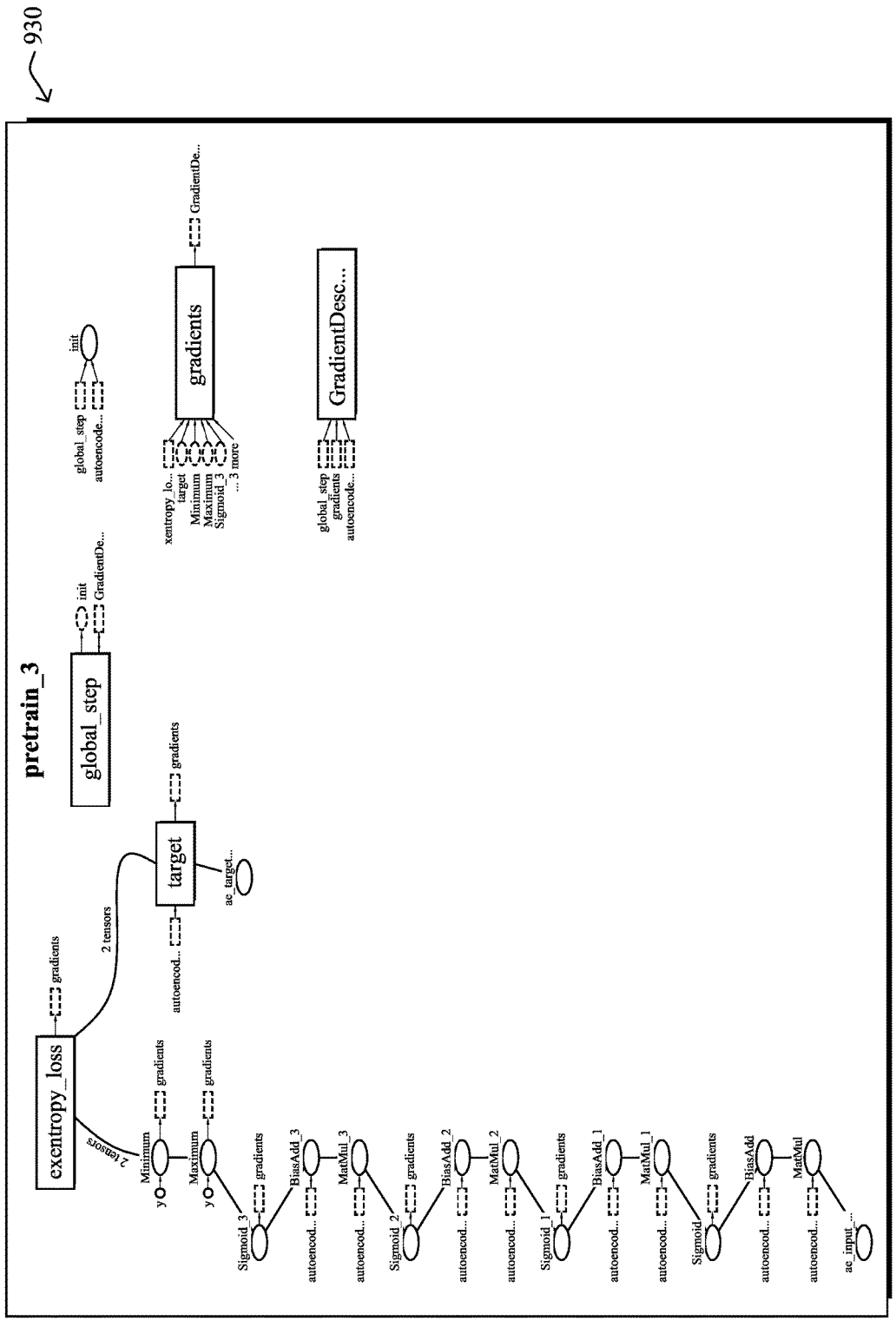

For completeness, FIG. 9D illustrates the architecture of autoencoder 930, the third of the stacked autoencoders. Like its predecessors, autoencoder 930 receives as input the encoding from the prior layer (e.g., autoencoder 920) and uses a greedy approach to generate its own outputs for processing by the final, output layer that is trained using labeled data.

Figure 10:
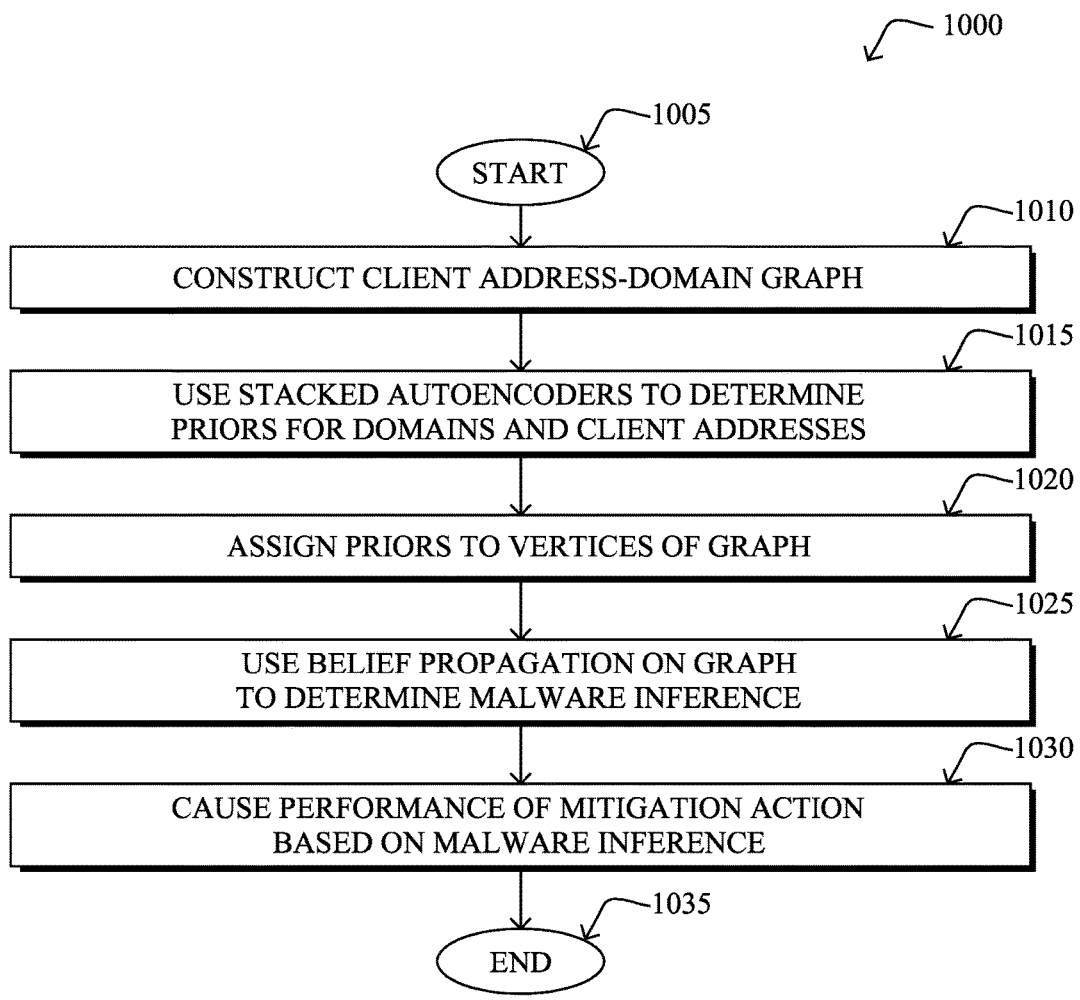
FIG. 10 illustrates an example simplified procedure for analyzing DNS traffic.

FIG. 10 illustrates an example simplified procedure for analyzing DNS traffic in a network in accordance with one or more embodiments described herein. For example, a non-generic, specifically configured device (e.g., device 200) may perform procedure 1000 by executing stored instructions (e.g., process 248). The procedure 1000 may start at step 1005, and continues to step 1010, where, as described in greater detail above, the device may construct a graph based on DNS traffic. Such a graph may include vertices that represent the client addresses from the DNS traffic and vertices that represent the domains from the DNS traffic. Edges of the graph may also represent relationships between the vertices such as, for example, a DNS lookup query performed by a given client address for a particular domain.

At step 1015, as detailed above, the device may use stacked autoencoders to determine priors for the vertices of the graph from step 1010. In various embodiments, the device may use a first set of stacked autoencoders to determine the priors of domain-related vertices and may use a second, separate set of stacked autoencoders to determine the priors of the client address-related vertices. In various embodiments, the priors may indicate the probabilities of the corresponding domain or client address being malicious/malware-related. For example, an output layer of the stacked autoencoders may be trained using labeled data that indicates whether a particular domain or client address is malicious.

At step 1020, the device may assign the determined priors to the corresponding vertices of the graph, as described in greater detail above. Thus, for example, a particular vertex of the graph that represents a domain may have an assigned probability of the domain being malicious. Similarly, the client address-related priors may also be assigned to their corresponding vertices.

At step 1025, as detailed above, the device may use belief propagation on the graph to determine a malware inference from the graph. In particular, the device may perform message passing between the vertices of the graph, to update their assigned probabilities based on their neighbors and the probabilities assigned to their neighbors. For example, if a particular client address vertex has a low malware probability, but is neighbors with a large number of malware-related domains (e.g., the client queried the domains), the device may increase the malware probability associated with the vertex using belief propagation. In turn, this probability may be taken as a malware inference regarding the client address.

At step 1030, the device may cause the performance of a mitigation action based on the malware inference, as described in greater detail above. For example, if a particular client address has a high probability of being infected with malware, the device may cause traffic to or form the client to be blocked, an alert to be generated, etc. In this way, the device may help to protect the clients in the network from infections and flag potentially malicious domains. Procedure 1000 then ends at step 1035.

It should be noted that while certain steps within procedure 1000 may be optional as described above, the steps shown in FIG. 1000 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce a model that is responsive to different user behaviors in DNS traffic and can differentiate between benign and malicious domains and client IP addresses. This is in sharp contrast to using static approaches, such as domain-IP or domain-registrant graphs. In some aspects, the model is capable of incrementally learning with new observations that are labelled and unlabeled, rather than dependent on hand-crafted features and labelled data only. Further, with the use of stacked auto-encoders, the techniques herein can leverage the latest advancements in computing, such as using GPU-based computing.

While there have been shown and described illustrative embodiments that provide for the detection of malicious domains and client addresses in DNS traffic, it is to be understood that various other adaptations and modifications may be made within the spirit and scope of the embodiments herein. For example, while certain embodiments are described herein with respect to using certain models, the models are not limited as such other models may be used as desired, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   constructing, by a device in a network, a graph based on Domain Name System (DNS) traffic, wherein some vertices of the graph correspond to client addresses from the DNS traffic and some vertices of the graph correspond to domains from DNS traffic;
   using, by the device, stacked autoencoders to determine priors for the domains and client addresses, wherein the priors are prior probabilities of corresponding domains and client addresses being malicious;
   assigning, by the device, the determined priors to the corresponding vertices of the graph;
   using, by the device, belief propagation on the graph to determine a malware inference from the graph; and
   causing, by the device, performance of a mitigation action when the malware inference from the graph indicates the presence of malware.

2. The method as in claim 1, wherein the mitigation action comprises one of: generating an alert based on the malware inference or blocking traffic associated with a potentially infected client.

3. The method as in claim 1, further comprising:
   receiving, at the device, data indicative of the DNS traffic; and
   extracting, by the device, the client addresses and domains from the data indicative of the DNS traffic.

4. The method as in claim 1, wherein an output of the stacked autoencoders is a probability of a particular domain or client address being malware-related.

5. The method as in claim 1, wherein using stacked autoencoders to determine priors for the domains and client addresses comprises:
   using, by the device, a first set of stacked autoencoders to determine the priors for the domains; and
   using, by the device, a second set of stacked autoencoders to determine the priors for the client addresses, wherein the first and second sets of stacked autoencoders differ.

6. The method as in claim 5, wherein using the first set of stacked autoencoders to determine the priors for the domains comprises:
   determining, by the device, domain-related features of the DNS traffic for one or more of: a local time window, a global time window, or domain-related microservices; and
   constructing, by the device, a domain-related feature vector for input to the first set of stacked autoencoders.

7. The method as in claim 5, wherein using the second set of stacked autoencoders to determine the priors for the client addresses comprises:
   determining, by the device, client address-related features of the DNS traffic for one or more of: a local time window or client address-related microservices; and
   constructing, by the device, a client address-related feature vector for input to the second set of stacked autoencoders.

8. The method as in claim 1, wherein using belief propagation on the graph to determine a malware inference from the graph comprises:
   updating, by the device and for a particular vertex of the graph, the prior assigned to the particular vertex based on a number or type of edges connected to the particular vertex in the graph.

9. The method as in claim 8, wherein the prior assigned to the particular vertex is further updated based in part on the priors assigned to the vertices connected to the particular vertex.

10. An apparatus, comprising:
    one or more network interfaces to communicate with a network;
    a processor coupled to the network interfaces and configured to execute one or more processes; and a memory configured to store program instructions executable by the processor, the program instructions when executed operable to:
construct a graph based on Domain Name System (DNS) traffic, wherein some vertices of the graph correspond to client addresses from the DNS traffic and some vertices of the graph correspond to domains from DNS traffic;
use stacked autoencoders to determine priors for the domains and client addresses, wherein the priors are prior probabilities of corresponding domains and client addresses being malicious;
assign the determined priors to the corresponding vertices of the graph;
use belief propagation on the graph to determine a malware inference from the graph; and
cause performance of a mitigation action when the malware inference from the graph indicates the presence of malware.

11. The apparatus as in claim 10, wherein the mitigation action comprises one of: generating an alert based on the malware inference or blocking traffic associated with a potentially infected client.

12. The apparatus as in claim 10, wherein the program instructions when executed is further operable to:
receive data indicative of the DNS traffic; and
extract the client addresses and domains from the data indicative of the DNS traffic.

13. The apparatus as in claim 10, wherein an output of the stacked autoencoders is a probability of a particular domain or client address being malware-related.

14. The apparatus as in claim 10, wherein the apparatus uses the stacked autoencoders to determine priors for the domains and client addresses by:
using a first set of stacked autoencoders to determine the priors for the domains; and
using a second set of stacked autoencoders to determine the priors for the client addresses, wherein the first and second sets of stacked autoencoders differ.

15. The apparatus as in claim 14, wherein the apparatus uses the first set of stacked autoencoders to determine the priors for the domains by:
determining domain-related features of the DNS traffic for one or more of: a local time window, a global time window, or domain-related microservices; and
constructing a domain-related feature vector for input to the first set of stacked autoencoders.

16. The apparatus as in claim 14, wherein the apparatus uses the second set of stacked autoencoders to determine the priors for the client addresses by:
determining client address-related features of the DNS traffic for one or more of: a local time window or client address-related microservices; and
constructing a client address-related feature vector for input to the second set of stacked autoencoders.

17. The apparatus as in claim 10, wherein the apparatus uses belief propagation on the graph to determine a malware inference from the graph by:
updating, for a particular vertex of the graph, the prior assigned to the particular vertex based on a number or type of edges connected to the particular vertex in the graph.

18. The apparatus as in claim 17, wherein the prior assigned to the particular vertex is further updated based in part on the priors assigned to the vertices connected to the particular vertex.

19. A tangible, non-transitory, computer-readable medium storing program instructions that cause a device in a network to execute a process comprising:
constructing, by the device, a graph based on Domain Name System (DNS) traffic, wherein some vertices of the graph correspond to client addresses from the DNS traffic and some vertices of the graph correspond to domains from DNS traffic;
using, by the device, stacked autoencoders to determine priors for the domains and client addresses, wherein the priors are prior probabilities of corresponding domains and client addresses being malicious;
assigning, by the device, the determined priors to the corresponding vertices of the graph;
using, by the device, belief propagation on the graph to determine a malware inference from the graph; and
causing, by the device, performance of a mitigation action when the malware inference from the graph indicates the presence of malware.

20. The computer-readable medium as in claim 19, wherein using stacked autoencoders to determine priors for the domains and client addresses comprises:
using, by the device, a first set of stacked autoencoders to determine the priors for the domains; and
using, by the device, a second set of stacked autoencoders to determine the priors for the client addresses, wherein the first and second sets of stacked autoencoders differ.

* * * * *